W. ASHWORTH.
CARBURETER.
APPLICATION FILED JAN. 28, 1920.

1,395,170.

Patented Oct. 25, 1921.
2 SHEETS—SHEET 1.

WITNESSES

INVENTOR
WILLIAM ASHWORTH
BY
ATTORNEYS

W. ASHWORTH.
CARBURETER.
APPLICATION FILED JAN. 28, 1920.

1,395,170.

Patented Oct. 25, 1921.
2 SHEETS—SHEET 2.

WITNESSES

INVENTOR
WILLIAM ASHWORTH
BY
ATTORNEYS

UNITED STATES PATENT OFFICE.

WILLIAM ASHWORTH, OF NORTH ADAMS, MASSACHUSETTS.

CARBURETER.

1,395,170.  Specification of Letters Patent.  Patented Oct. 25, 1921.

Application filed January 28, 1920. Serial No. 354,588.

*To all whom it may concern:*

Be it known that I, WILLIAM ASHWORTH, a citizen of the United States, and a resident of North Adams, in the county of Berkshire and State of Massachusetts, have invented a new and Improved Carbureter, of which the following is a full, clear, and exact description.

This invention relates to certain new and improved details of construction to be associated with a carbureter, whereby to produce efficiency of operation which has been heretofore unobtainable.

It is well known that the best proportions to be produced by a carbureter for volatile fuel are approximately sixteen parts of air to one part of gasolene. This proportion seems to be the most ideal for both fast and slow engine speeds after the cylinder walls have become slightly warmed. However, in view of the fact that the suction is not proportionate to the speed of the engine when making a high number of R. P. M., too rich and sometimes too thin a mixture has been produced. For this reason, as is well known, a carbureter is provided with a low speed and high speed adjustment, which high speed adjustment permits of the opening usually of an additional air valve in proportion to the suction exerted by the consuming unit.

It is also well known that numerous devices have appeared upon the market, and been adopted by numberless owners of automobiles, having in mind the supply of additional air at a point intermediate the carbureter and manifold of a power unit. Assuming now that an engine is turning 1800 R. P. M., which would amount to a fairly high-grade speed if the same were applied to an automobile, it will be appreciated, providing the power unit is furnished with an auxiliary air inlet, that the same would be open and the proportions of fuel might run approximately from twenty to thirty parts of air as against one part of volatile fuel. While this condition might prove highly desirable from an economical standpoint on level ground where very little power was needed, it is well known that it would be impossible to maintain an equal R. P. M. if a sudden load were encountered, such as a steep grade in the road. For this reason, many operators of cars, when desiring to maintain a contant speed under increased load, operate the "choke" so as to increase the proportion of the volatile fuel utilized. If the above is resorted to the engine often chokes, and if it is not resorted to the engine drives the car at a materially lessened speed which is liable to necessitate the shifting of gears.

With the above in mind I have constructed a carbureter embodying a simple form of high speed adjustment which will permit of as near an ideal mixture being produced at all ranges of speed, as possible.

Reference is had to the attached sheets of drawings which illustrate practical embodiments of my invention in which.

Figure 1:
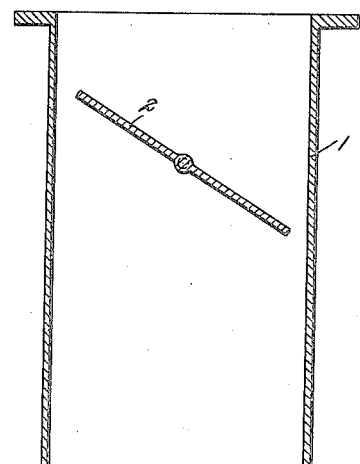
Figure 1 is an enlarged sectional side view taken through a carbureter constructed in accordance with my invention.

In all of these views like reference numerals designate similar parts, and the reference numeral 1 indicates a fuel inlet pipe in which there is positioned a throttle valve 2. Associated with said fuel-inlet pipe 1 is a carbureter, including a conventional float chamber 3 housing a float 4 operating a fuel inlet valve 5; a fuel nozzle 6 being in communication with the float chamber 3 and having its upper end encircled by a Venturi tube.

Contrary to the conventional Venturi tubes, my improved carbureter employs a Venturi tube which is formed in two sections 7 and 8, each comprising an annular collar having its inner face formed so as to produce one-half of the completed Venturi tube, the parts being so fitted together as to provide a substantially air-tight connection between their points of contact.

Both of the sections 7 and 8 are provided with any suitable number of bores 9, which are adapted to aline with one another so as to form continuous passages parallel to the main opening of the Venturi tube when the parts are in their normal position.

Either of the sections 7 and 8 may be stationary with respect to the fuel-inlet pipe 1, the second section being mounted rotatably with respect to the stationary section and being adapted to be operated by any suitable means, such as a fixed lug 10 provided with an operating rod 11, which may be actuated as has been illustrated, for instance, by means of a contrifugal governor 12 coupled directly with the power plant.

Assuming that my improved carbureter is employed in conjunction with the power plant associated with an automobile, providing that the same is moving forward at an engine speed of 1000 R. P. M. along a level road, it will be seen that the throttle valve 2 will be so positioned as to maintain the constant speed desired; i. e., slightly closed, and it will be appreciated that the greatest amount of suction at this position will occur at the throttle valve.

Figure 2:
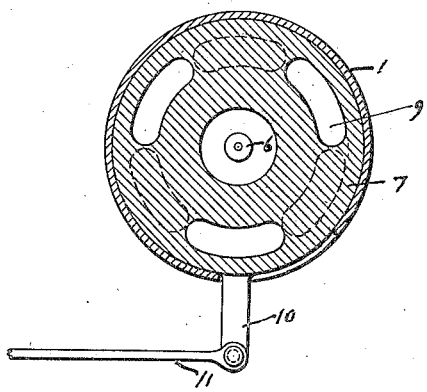
Fig. 2 is a sectional plan view taken along line 2—2 of Fig. 3.

Assuming now that the engine is speeding up, it being appreciated that the bores 9 are in non-alining position, as has been illustrated in Fig. 2, when the engine is idling or stopped, it will be seen that the centrifugal governor 12 will cause, due to its proportionate speeding up, movement on the part of the rod 10, resulting in an alining of the bores 9, and permitting the passage of additional air through the carbureter.

Upon the engine slowing down, the air supply is automatically cut down, and the suction upon the fuel supply increased by virtue of the fact that the bores 9 gradually assume a more and more non-alining position, which will increase the suction through the venturi and cause an injection of a richer fuel mixture within the cylinders of the engine. This operation will result in an increase of power, permitting a proportionate increase of load upon the engine.

Assuming now that the clutch is left in, and the automobile with which the carbureter and engine are associated, begins a descent as the speed of the car increases and the number of R. P. M. of the engine and crank shaft increase proportionately, the bores 9 will aline, thus permitting a maximum amount of air to be drawn into the cylinders without any proportionate increase of suction upon the fuel nozzle.

From the above it will be appreciated that I have constructed a carbureter which will act as a substitute for the additional air inlets now upon the market, and which will have none of their inherent defects. It will however be seen that the auxiliary air opening of a fuel mixing device constructed in accordance with my invention will always be proportional to the opening in the by-passes in the Venturi tube, or in other words the speed of the engine controls the proportion of the air and gas in the mixture supplied to the same. From this it will be seen that when the carbureter is properly adjusted there will never be a richer mixture than that composed of the proper proportions supplied, and that the mixture will never vary from this density to an extremely lean mixture.

Figure 3:
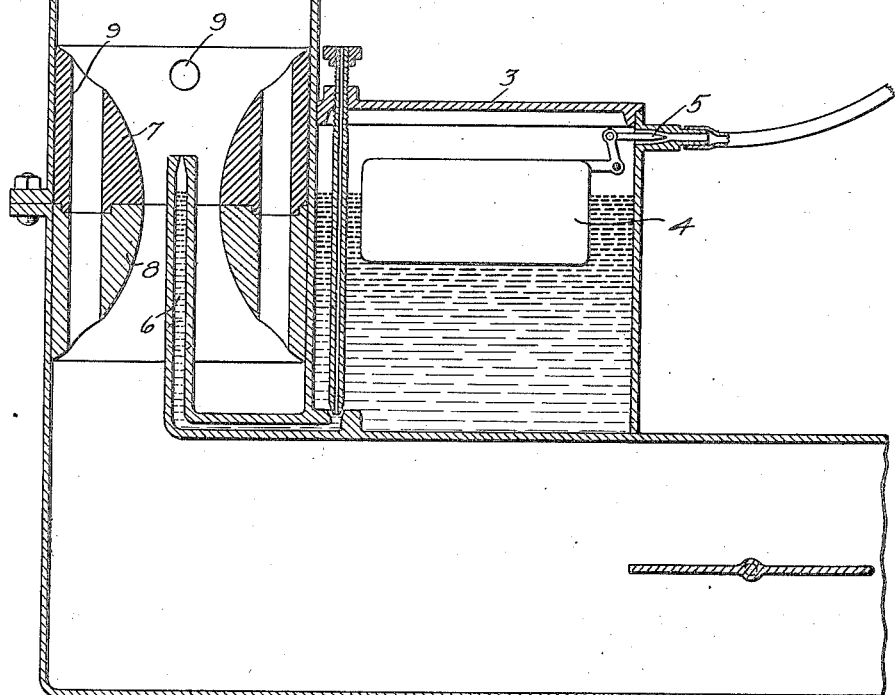
Fig. 3 is a side view of the unit as a whole.
Figure 3:
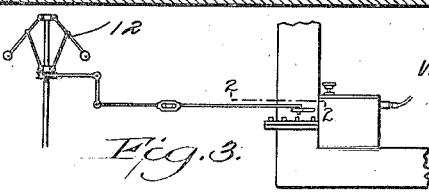
Figure 4:
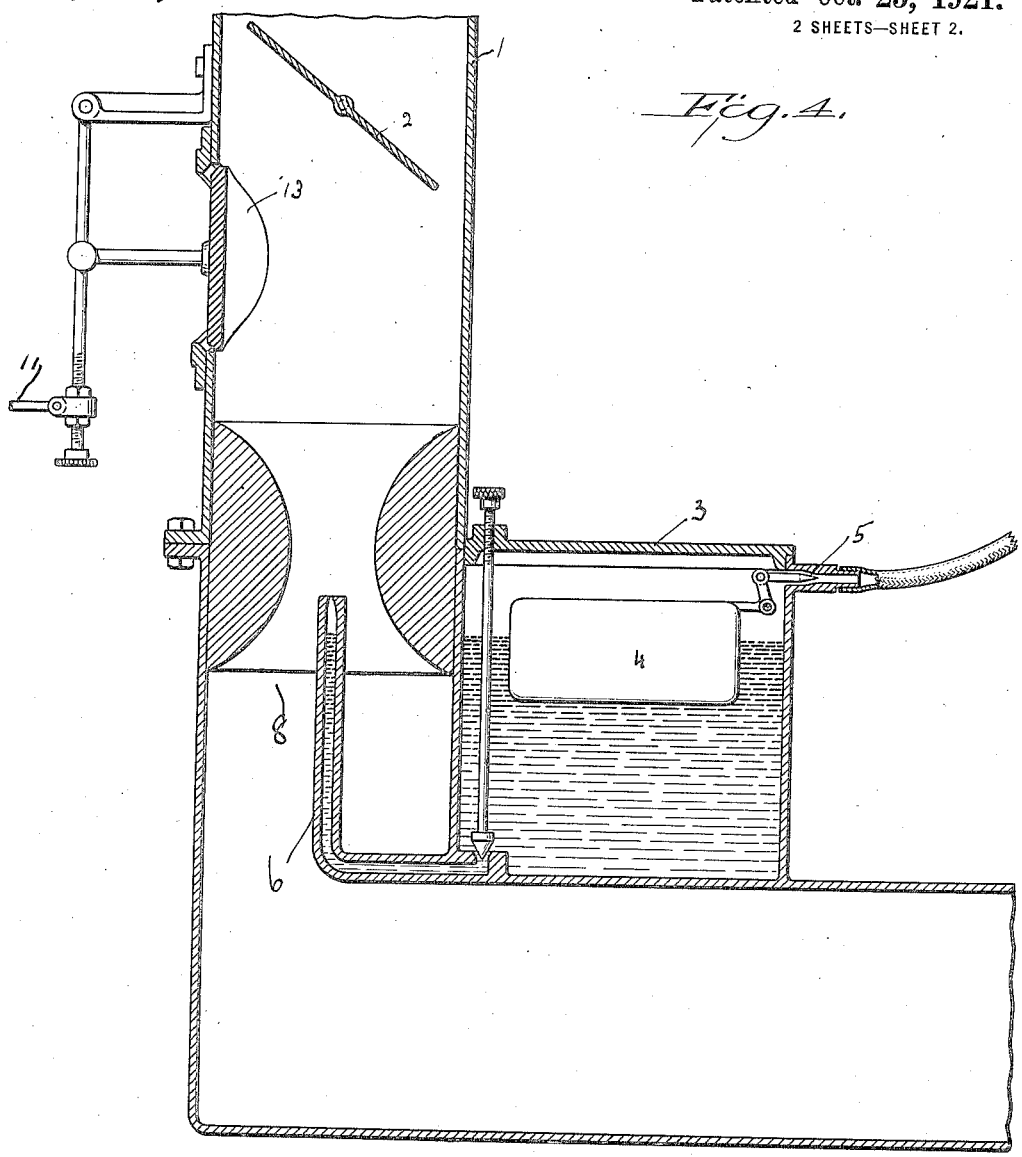
Fig. 4 illustrates a modified form of my device.

Referring now to the construction illustrated by Fig. 4, it will be seen that this form of construction permits of an operation corresponding to the operation produced by the structure illustrated in Figs. 1, 2 and 3, and that a centrifugal governor in this instance will control the operating rod 11, and proportionately control the opening of the valve 13, the action of this latter device being readily appreciated from the foregoing description.

It will be understood that numerous modifications in construction may well be resorted to without in the least departing from the scope of my claim.

I claim:

A carbureter, including a venturi, comprising two annular sections fitted together, each of said sections being formed with air by passes, and means for automatically moving one of said sections with respect to the second of the same for alining the air by passes and regulating the passage of air through the same in direct ratio to the speed of the engine with which the carbureter is associated.

WILLIAM ASHWORTH.